United States Patent

[11] 3,609,664

| [72] | Inventor | Paul E. Bosen<br>Warren, Mich. |
|---|---|---|
| [21] | Appl. No. | 668,004 |
| [22] | Filed | Sept. 15, 1967 |
| [45] | Patented | Sept. 28, 1971 |
| [73] | Assignee | The Cross Company<br>Fraser, Mich. |

[54] AUTOMATIC CONTROL FOR MEASURING CLEARANCES
30 Claims, 7 Drawing Figs.

[52] U.S. Cl. ..................................................... 340/172, 340/282
[51] Int. Cl. ................................................... H04q 9/06
[50] Field of Search............................................ 340/172, 282, 270; 328/151

[56] References Cited
UNITED STATES PATENTS

| 2,453,454 | 11/1948 | Norwine | 340/172 UX |
|---|---|---|---|
| 3,138,760 | 6/1964 | Gilbert | 340/172 UX |
| 3,158,759 | 11/1964 | Jasper | 328/151 X |
| 3,197,756 | 7/1965 | Maynard | 340/282 X |
| 3,431,760 | 3/1969 | Martens | 340/172 X |

*Primary Examiner*—John W. Caldwell
*Assistant Examiner*—Michael Slobasky
*Attorney*—Harness, Dickey & Pierce ABSTRACT: An automatic control for detecting and averaging maximum signal peaks and minimum signal valleys wherein the variation in signal level is sensed and fed to a pair of detectors, the first detector providing an output signal indicative of the maximum signal level and the second detector providing an indication of the minimum signal level. The maximum and minimum signal levels are fed through an averaging circuit to provide a mean or average of the maximum and minimum signals, the mean signal being utilized to control the operation of the signal generator.

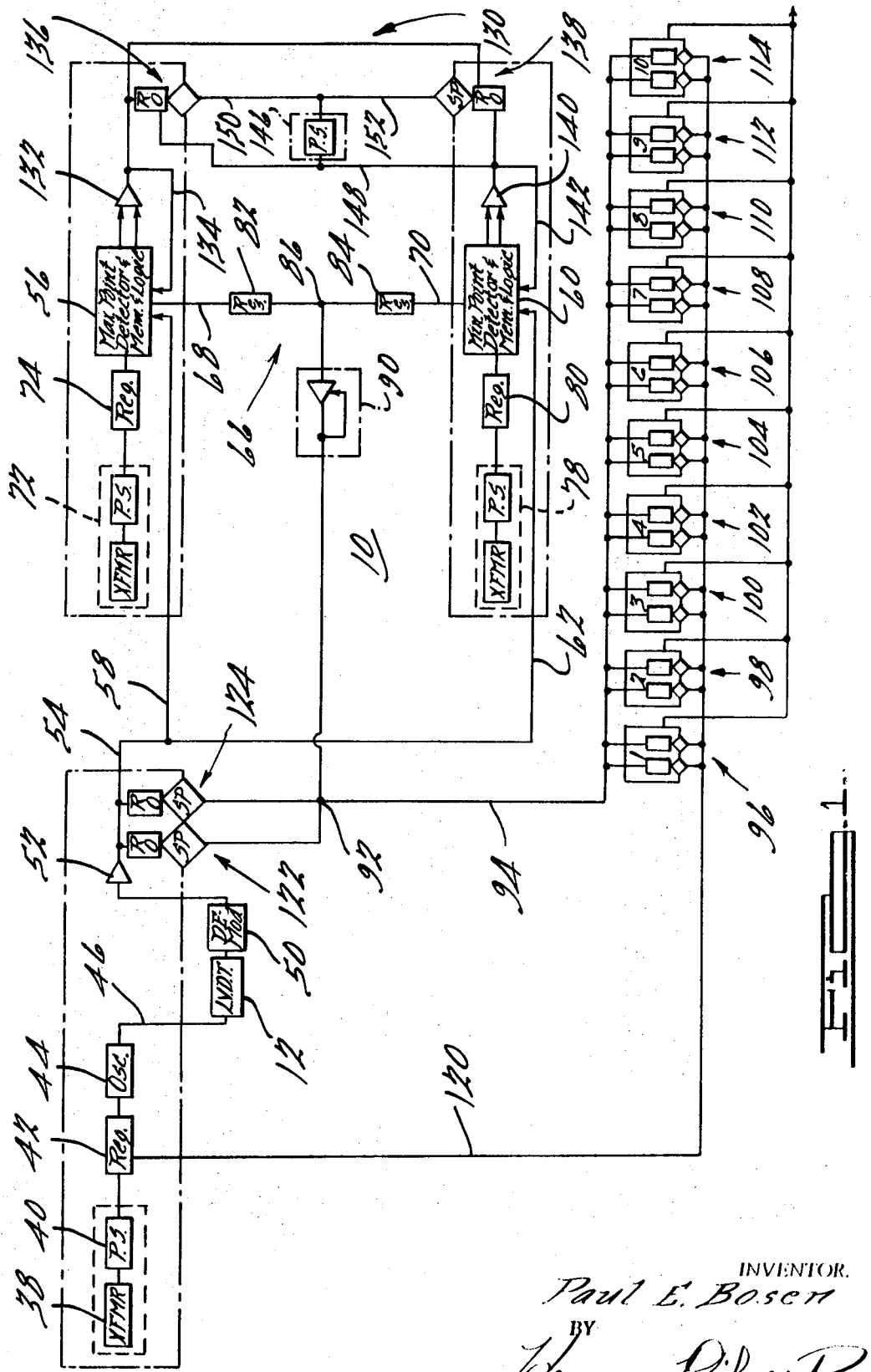

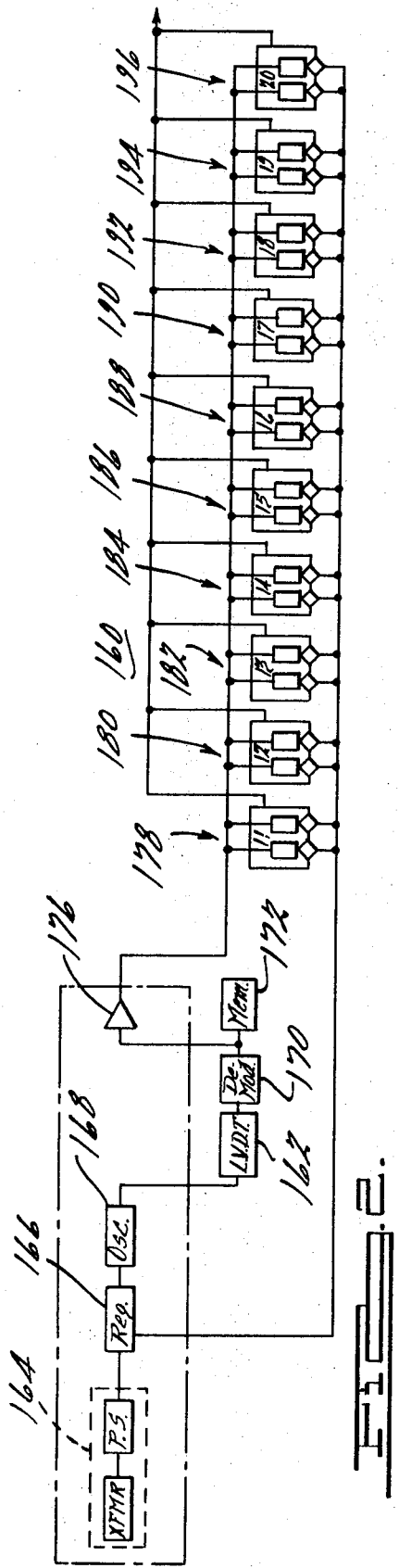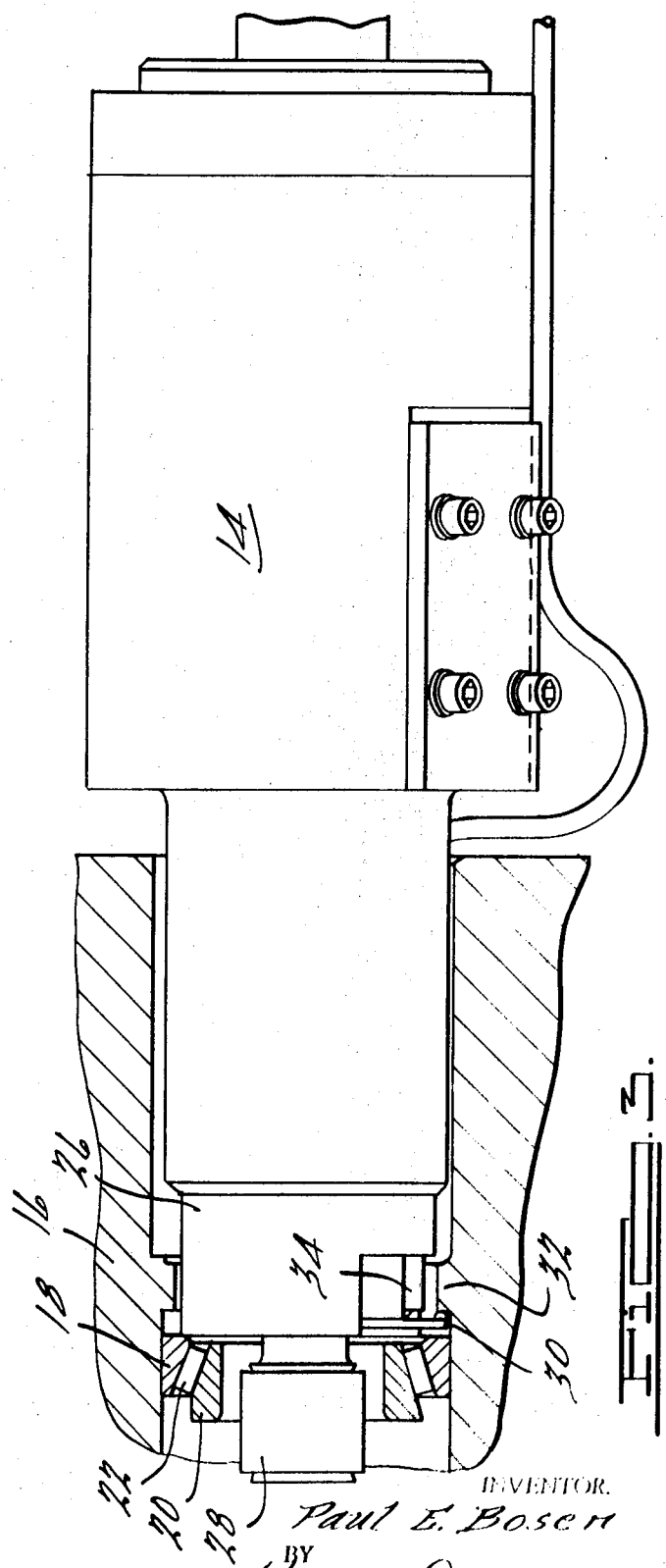

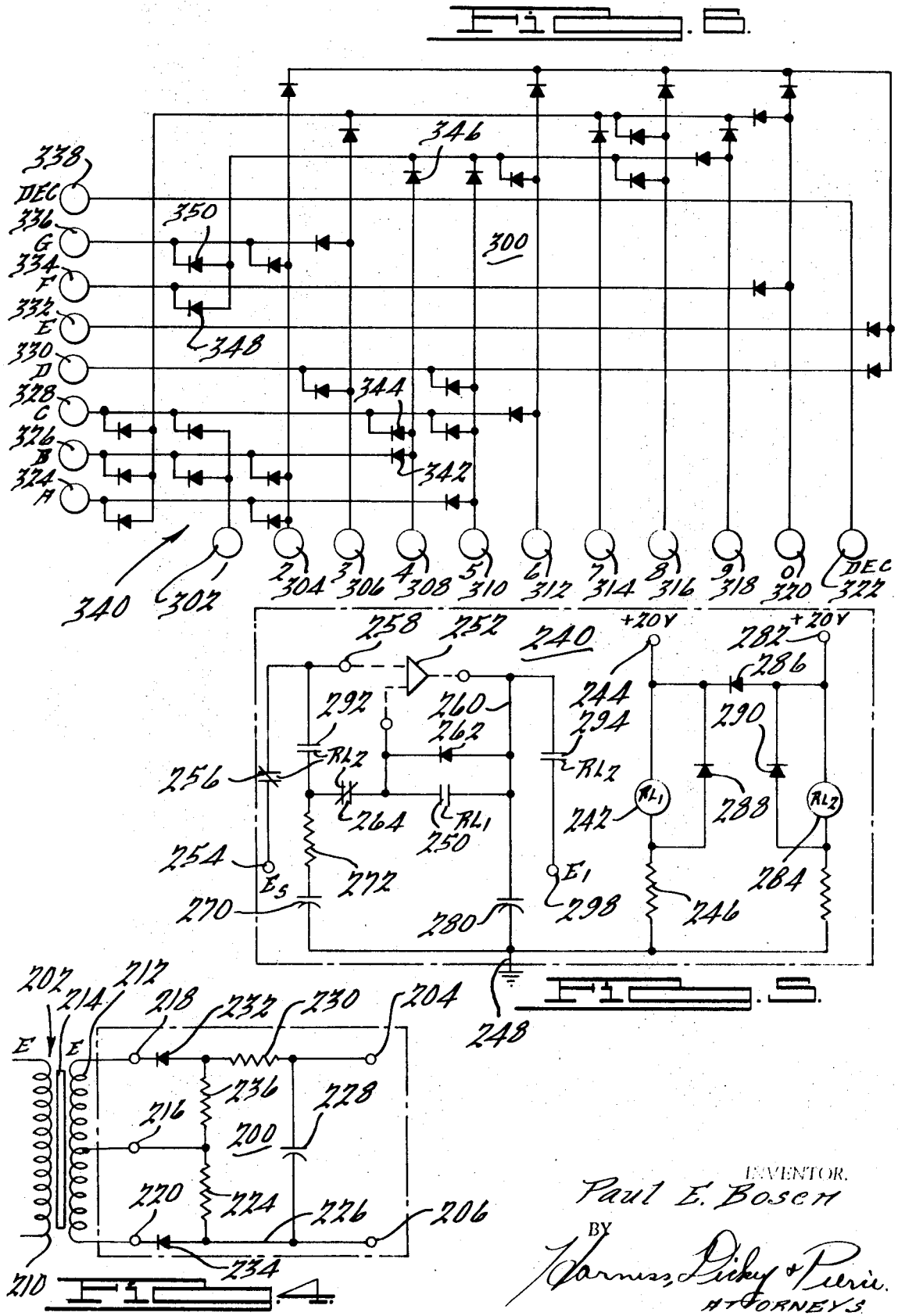

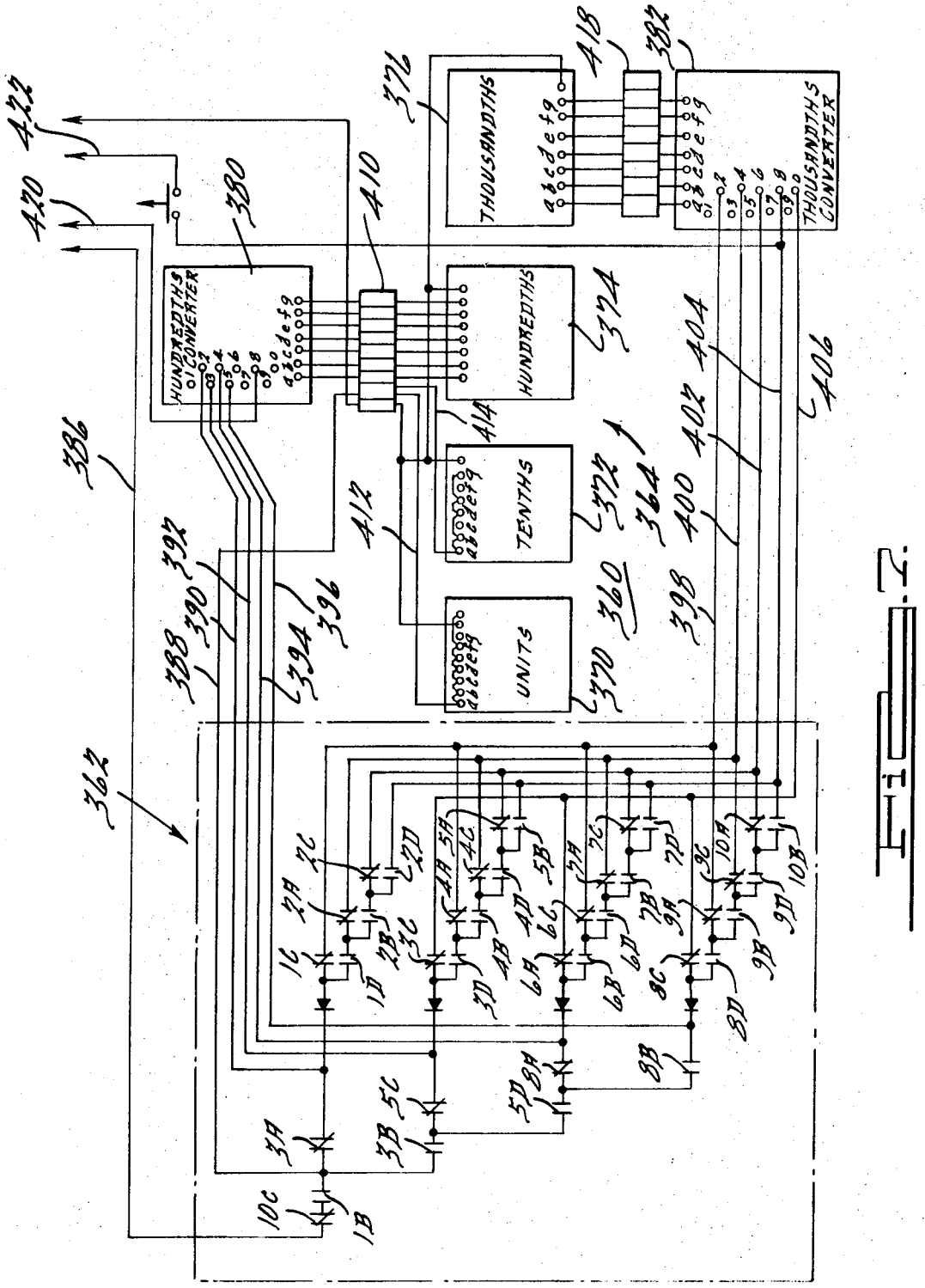

AUTOMATIC CONTROL FOR MEASURING CLEARANCES

SUMMARY AND BACKGROUND OF THE INVENTION

The present invention generally relates to a system for measuring the deviation of a moving member from a fixed point, and more particularly is adapted to measure the maximum, minimum and the mean variation of the member from a fixed plane in a direction perpendicular to the plane and includes a provision for positioning the member at the mean distance from the fixed plane.

The system of the present invention was devised in connection and is particularly adapted for use with an automatic mechanism for selecting and positioning shims adjacent the bearings in the differential drive assembly during the automatic assembly thereof. The above differential drive may be of the type provided with an inner ring gear case having aligned shaft portions disposed in bearings mounted on seats provided in an outer carrier. In the assembly of the differential drive, it is necessary to preselect the amount of backlash which exists between the pinion and the ring gear during the assembly of the drive. In prior systems it has been the practice to measure the runout of the ring gear and the pinion during rotation of the ring gear case by a drive means and to select a shim in accordance with either the maximum or minimum point of runout of the ring gear. Certain problems have existed with this system in that, if the shim is selected for the maximum runout point, the gears have a tendency to bind when the minimum point is reached and contrariwise, if the minimum point of runout is selected for the shim, the gears have a tendency to become loose when the maximum point is reached.

With the system of the present invention, the outer carrier of the differential drive is supported relative to a gage head such that the gage head is insertable into engagement with the ring gear case and a preselected loading of the bearings rotatably supporting the ring gear case is provided by the gage head. Upon rotation of the ring gear case, the runout of the ring gear and pinion is measured and fed through a transducer to the system of the present invention. Thus, an accurate measure of the space between the bearings and their respective seats is provided for the selection of shims for placement adjacent the bearings when the ring gear is in the mean runout position.

The system of the present invention includes a differential transducer which is positioned within the edge head adjacent the bearings to sense the runout of the ring gear and pinion and provide an output signal which varies in accordance with the runout of the ring gear and pinion. This signal is amplified and fed to detector circuits which detect both the maximum and minimum amplitude of the transducer signal and store this signal during the initial rotation of the inner gear case.

Upon the determination of the maximum peak and the minimum valley, the circuit is switched to feed both the maximum and minimum signal to an averaging circuit which generates a signal, the amplitude of which indicates the mean runout of the particular differential drive being sensed by the transducer. This mean signal is fed to an output indication circuit in the form of a plurality of relay operators which are biased in accordance with the particular shim to be selected for placement adjacent the bearings.

The mean signal is further fed to a second pair of relay operators, the first of which senses the mean signal and compares the mean signal to the runout signal continuously being sensed upon a second rotation. The rotation of the ring gear case is stopped by the first relay operator when the mean is being approached from the minimum valley point to the mean runout point and the second relay operator senses the approaching of the mean runout point on the ring gear and pinion assembly as it is approached from the maximum runout point. Upon the operation of this second set of relay operators, the rotation of the ring gear is stopped for insertion of the shim in accordance with the shim selection mechanism.

The system further includes a means for providing an incremental classification of the runout being sensed so that the runout may be displayed on a bar light system or other type of known displays. The present invention further includes a novel detector circuit including a memory and a circuit for switching the system from the maximum and minimum detection modes to the mean generation mode of operation. There is further provided a novel switching system for selecting certain sizes of shims in accordance with the mean runout detected.

While the system of the present invention is described in the environment of a system for measuring the runout of a ring gear and pinion for a differential drive assembly, it is to be understood that the circuit may be utilized to detect, measure, store and average any variation in distance between two points.

It is one object of the present invention to provide an improved measuring circuit.

It is another object of the present invention to provide an improved measuring circuit having the capability of detecting and storing both the maximum and minimum deviation of a signal from a fixed level and providing the mean or average of those signals.

It is still another object of the present invention to provide an improved measuring circuit for sensing the maximum and minimum deviation of a moving member from a fixed point and stopping movement of the moving member at the mean or average deviation.

It is still another object of the present invention to provide a switching system for switching a circuit from one mode of operation to a second mode of operation in response to a varying input signal wherein the switching system is supplied with a bias which is the average of the variation of the input signal and wherein the switching occurs upon the second occurrence of the input signal obtaining the average variation.

It is still another object of the present invention to provide an improved maximum and minimum variation measuring circuit of the type described which is adapted to be utilized in conjunction with measuring the average variation in runout of a ring gear and pinion of a differential drive assembly.

It is still another object of the present invention to provide an improved measuring circuit of the type described which is adapted to select a shim for the bearings of a differential drive assembly, the size of the shim being correlated with the mean runout of the pinion and ring gear of the differential drive.

It is still another object of the present invention to provide an improved runout measuring system of the type described for use in conjunction with assembling a differential drive assembly wherein the ring gear and pinion of the differential drive assembly may be positioned at the mean runout position.

It is still a further object of the present invention to provide an improved maximum or minimum signal detector for use with a measuring system of the type described.

It is still a further object of the present invention to provide an improved detection and averaging circuit for detecting the maximum and minimum deviation of a signal from a fixed level and subsequently deriving the average of the two signals.

Further objects, features and advantages of this invention will become apparent from a consideration of the following description, the appended claims and the accompanying drawings in which:

FIG. 1 is a block diagram illustrating the details of a preferred system for sensing, detecting, storing and deriving a mean for the maximum and minimum variation of a signal;

FIG. 2 is a block diagram of a system for sensing, detecting and storing the variation of a signal;

FIG. 3 is an elevation view of a gage head which may be utilized in conjunction with the circuit of the present invention to sense the runout of a ring gear and pinion assembly of a differential drive;

FIG. 4 is a schematic diagram illustrating the circuit elements of one preferred form of demodulator circuit adapted to be utilized in the system of FIGS. 1 and 2;

FIG. 5 is a schematic diagram illustrating the circuit elements of a preferred form of detection and memory circuit which may be utilized to detect and store the maximum or the minimum signal from the transducer in the circuit of FIG. 1;

FIG. 6 is a schematic diagram illustrating the circuit elements of a matrix which may be utilized in connection with the system of the present invention to provide control signals for a bar light display for indicating the sensed conditions of the transducer; and FIG. 7 is one preferred form of switching system for providing a digital output indication of the operation of the circuit of FIGS. 1 and 2 and particularly a selection network which may be utilized to select a particular shim to be inserted adjacent the bearings of a differential drive assembly in one use of the circuits.

Referring now to the drawing, and particularly to FIG. 1, there is illustrated a circuit 10 for sensing, detecting, storing and averaging the maximum and minimum signals derived from a transducer unit. The signal to be measured is derived from a low voltage differential transformer circuit 12 which includes a differential transformer preferably having a primary winding energized by an alternating current and two secondary windings or a center-tapped winding, as shown in the drawings. The primary and secondary windings are magnetically coupled by a movable armature member, the movement of the armature member being controlled in accordance with the distance to be measured.

One form of measuring assembly is illustrated in FIG. 3 wherein a gage head 14 is inserted into a support casing 16 of a differential drive assembly of the type described above. The differential drive assembly includes a pair of bearing races 18, 20 separated by a plurality of tapered bearings 22. The bearings are adapted to axially load and provide rotational support for a ring gear pinion assembly supported in an inner ring gear case (not shown).

The gage head 14 includes a plurality of telescoping members 26, 28, the member 26 being adapted to axially preload the bearing races 18 and 20 against a portion of the ring gear and pinion assembly and the member 28 is inserted into the ring gear and pinion assembly to rotate these latter members for measurement of the runout of the gears relative to a fixed point. The fixed point is established by means of a finger 30 engaging a portion 32 of the casing to lock the gage head 14 into position. Upon rotation of the ring gear and pinion assembly, the inner race 20 will vary axially in distance from a gage finger 34 thus sensing the undulations or runout of the ring gear and pinion assembly.

The finger 34 comprises the sensing member or armature of the low voltage differential transformer 12 described in conjunction with FIG. 1 to produce a movement of the armature in accordance with the variation in spacing of the face of the ring gear relative to the finger 34 as sensed through the bearing race 20. It is this maximum and minimum variation which the circuitry of FIG. 1 is adapted to sense and detect.

The above description of the gage head assembly comprises only one use of the system of the present invention. It is to be understood that the circuit may be utilized to sense and detect maximum and minimum variations of any movable member and derive a mean or average value therefor.

The low voltage differential transformer 12 is supplied with electrical energy from a transformer 38 and power supply system 40 which supplies an alternating current electrical energy to a regulator circuit 42. The regulator circuit supplies a regulated direct current to an oscillator 44, the oscillator generating an alternating current voltage on output conductor 46. This alternating current voltage in the preferred embodiment has a magnitude of 4.2 volts r.m.s. and a frequency of 1,060 cycles per second.

The sensed deviation of the gage head finger generates an alternating current voltage from the low voltage differential transformer circuit 12 which varies in amplitude from 0 to 4.2 volts depending on the position of the armature. This output signal is fed to a demodulator circuit 50 which transforms the 0 to 4.2 alternating current voltage to a direct current voltage which varies from a negative 3 volts to a positive 3 volts DC potential depending on the position of the armature relative to the output coils. These voltages have been chosen for illustrative purposes only and are not intended to be limiting.

The output voltage of the demodulator circuit is fed to an amplifier 52 which transforms the bidirectional variation of direct current voltage in the demodulator circuit 50 to a unidirectional voltage varying from 0 to plus 6 volts DC. The output from the amplifier circuit 52 is fed as an analog readout on an output conductor 54, the variation in potential on the output conductor 54 being determined by the position of the armature and the differential transformer circuit 12.

The output signal on conductor 54 is fed to a maximum point detector, memory and logic circuit 56 by means of a conductor 58 and also to a minimum point detector, memory and logic circuit 60 by means of a conductor 62. The circuits 56 and 60 are devised to generate an output signal which is indicative of the deflection of the armature in the differential transformer circuit 12 in one direction in the case of a detector 56 and the minimum deflection of the armature in the transformer circuit 12 in the case of the detector 60.

In the situation where a differential drive or other similar type of work is being measured, the detector circuits 56 and 60 generate and store a signal in accordance with the maximum and minimum deflection during the first revolution of the workpiece. The circuits are then switched such that the output signals are fed to an averaging circuit 66 by means of conductors 68, 70, respectively, during a second period or mode of operation of the system. The detector circuit 56 is supplied with electrical energy from a transformer and power supply circuit 72 through a regulator circuit 74 which regulates the voltage being supplied to the detector circuit 56. Similarly, the detector circuit 60 is supplied with electrical energy from a transformer and power supply circuit 78 through a regulator 80.

Upon the completion of the derivation of the maximum and minimum signals, the detector circuits 56 and 60 are switched to provide an output signal on conductors 68 and 70, respectively. These output signals on conductors 68 and 70 are fed through resistors 82, 84, respectively, such that the voltage at node point 86 is the average voltage of the maximum and minimum voltages on conductors 68 and 70. Accordingly the voltages at nodes 86 will be expressed by:

$$E_{86} = \frac{E_{max} + E_{min}}{2}$$

The average signal at node 86 is fed through an amplifier circuit 90 to a node 92 and it is to be noted that the signal at node 92 does not appear until such time as the mean has been established and the detector circuits 56 and 60 have been switched to provide the maximum and minimum output signals to resistors 82, 84. The voltage at node 92 is fed to a plurality of relay operator circuits 96 to 114, the relay operator circuits 96 to 114 being of the type such that two operating points of the voltage at 92 may be sensed by each relay operator circuit 96 to 114. Thus 20 distinct operating points of the voltage at node 92 may be sensed by the relay operator circuits 96 to 114.

In order to accomplish the variation in operating voltage level for the relay operators 96 to 114, a regulated voltage from the regulator circuit 42 is fed to the operator circuits 96 to 114 by means of a conductor 120. The voltage on conductor 120 is fed to each individual portion of the relay operator circuits 96 to 114 to provide a bias level for the relay operator circuits. The bias level for each relay operator circuit is varied in accordance with the particular operating point desired from the relay operator.

The circuit 10 may be connected in controlling relation with the rotating member 28 of the gage head 14 described in conjunction with FIG. 3 to stop the rotation of the member 28 at such time as the mean position for the runout is sensed during the second complete rotation of the ring gear and pinion assembly. To accomplish the braking mode, a pair of relay operators 122, 124 has been provided, the relay operators 122, 124 being connected between the conductor 54 and the node 92. As stated above, the signal on conductor 54 is continuously varying in accordance with the instantaneous deflection of the armature in the differential transformer 12. Further, the signal on node 92 is not present thereon until such time as the mean is established and the detector circuits 56 and 60 are switched to the output mode.

The relay operator 122 is set in an operating point to compare the approach of the signal being fed from the amplifier 52 to the mean signal as sensed by node 92 and will operate as the signal on conductor 54 approaches the mean signal from the low side. On the other hand, the relay operator 124 is set to sense the approach of the deviation of the armature in differential transformer circuit 12 from the high side such that the relay operator will be actuated when the mean signal is approached and reached from the high side.

The system is further provided with a circuit 130 for deriving the total difference signal between the maximum point of deflection and the minimum point of deflection as generated by detectors 56 and 60, respectively. Accordingly, the output signal from the maximum point detector is fed through an amplifier circuit 132 having a feedback loop 134 to a maximum point relay operator circuit 136. Similarly, the minimum point detector circuit provides an output signal to a minimum point relay operator 138 through an amplifier 140 also having a feedback loop 142. Electrical energy is supplied to the relay operators 136 and 138 by means of a power supply 146, the power supply 146 being biased in accordance with the minimum point signal as fed thereto by means of a conductor 148. Accordingly, the power supply circuit 146 "floats" and is referenced to the voltage of the minimum point detector and the circuit 130 provides a difference indication between the maximum and minimum deflection. The output of the power supply is fed to the relay operators 136 and 138 by means of conductors 150, 152, respectively. The output of the circuit 130 may be utilized to classify the maximum-minimum points in increments and fed to a bar light circuit or other like indication systems. Also, the relay operators may be utilized to provide an out-of-tolerance indication for the maximum and minimum points.

FIG. 2 illustrates a circuit 160 for sensing, detecting and storing the armature deflection in a manner similar to that described in conjunction with FIG. 1. As was the case with the circuit of FIG. 1, a low voltage differential transformer 162 is provided to continuously sense the deviation between a moving member and a fixed point. The electrical energy for the differential transformer 162 is fed by means of a transformer and power supply circuit 164 through a regulator 166 which regulates and transforms the alternating current from the power supply 164 to a direct current. The output of the regulator is connected to an oscillator 168, the oscillator 168 generating an alternating current signal which is sinusoidal in form, is of 4.2 volts r.m.s. and has a frequency of 1,060 cycles per second.

The output signal from the low voltage differential transformer 162 is fed through a demodulator circuit 170 to a memory circuit 172 including a capacitor for storing the instantaneous value of the signal derived from the differential transformer 162. The output of the memory circuit 172 is fed through an amplifier 176 to a bank of relay operator circuits 178 to 196 in a manner similar to that described in conjunction with FIG. 1. As was the case with the circuit of FIG. 1, each of the relay operator circuits 178 to 196 includes a pair of relays, with each of the pairs of relays cascaded to provide an output signal from a selected relay in accordance with the particular value read from the demodulator and memory circuits 170, 172.

The system of FIG. 2 may be utilized to sense the runout of the ring gear and pinion assembly on the opposite side to that sensed in conjunction with FIG. 1. In the case of FIG. 2, the relay operators 178, 196 are finally actuated and provide a shim selection at such time as the rotation of the gage head described in conjunction with FIG. 3 is stopped. Since the selection of the mean point for the side of the differential drive assembly connected to the circuit of FIG. 1, it is not necessary that an averaging and brake circuit be incorporated into the system of FIG. 2.

Referring now to FIG. 4 there is illustrated a demodulator circuit 200 which is adapted to translate the alternating current signal from the differential transformer circuit into a direct current voltage which varies in amplitude and polarity in accordance with the position of the core of the differential transformer. Particularly, a differential transformer 202 is interconnected with the demodulator circuit 200 to provide a direct current output signal on output conductors 204, 206.

The differential transformer includes a primary winding 210 which is magnetically coupled either to two secondary windings or a center-tapped secondary winding 212, through a movable core 214. The center-tapped embodiment is shown for illustrative purposes only, and it is to be understood that either is suitable. In both cases, the upper winding is devised to oppose the output of the lower winding to provide a differential output from the device. In the case of the center-tapped embodiment, the upper winding is oppositely wound to the lower to provide a series opposing flux arrangement. In the case of separate windings in the secondary, the windings may be oppositely wound and series connected or wound in aiding relation and oppositely connected. In the illustrated embodiment, the upper half of the secondary coil 212 between the center tap and upper end of the coil 212 is connected to a pair of input terminals 216, 218 and the lower half of the coil between the center tap and the lower end of the secondary winding 212 is interconnected between the terminal 216 and a terminal 220. When the upper end of the secondary winding 212 is negative relative to the center tap, a circuit is formed from center tap 216, through a resistor 236, a diode 232, point 218, and the upper half of winding 212. The lower end of winding 212 is also negative with respect to the center tap thus forming a circuit from the lower half to point 216, resistor 224, a diode 234 and back to the lower half of the winding 212.

In operation, and assuming that the core 214 is in an upper position relative to center, the upper half of the winding between terminals 216 and 218 would be of a low impedance while the lower half of the secondary winding 212 will be a high impedance due to the lack of coupling between the primary 202 and secondary winding 212. With the core 214 in the uppermost position and the upper end of coil 212 negative relative to the center tap, the capacitor 228 is charged plus to minus from top to bottom. On the opposite half cycle, the capacitor 228 is charged plus to minus from the top to bottom due to the difference between the voltages across the resistors 224 and 236. In the situation illustrated, the lower voltage is of a greater magnitude than the upper, thus providing a net positive voltage at the top of capacitor. The reverse situation is true with the armature shifted oppositely relative to the null position. The capacitor 228 is chosen to be of sufficient magnitude to cause the capacitor 228 to integrate the signals from the secondary winding 212. Thus, in the situation described, the terminal 204 is positive and the terminal 206 is negative and the voltage varies in accordance with the upward position of the core 214 relative to the center position. A similar situation would exist for the core 214 being in a lower position relative to center. However, the polarity of the output signal would be opposite and the magnitude would vary in accordance with the deviation of the core 214 relative to center.

FIG. 5 illustrates a preferred form of detector, memory and logic circuit 240 which may be utilized in conjunction with the system of FIG. 1. The particular circuit illustrated in FIG. 5 is the peak detector circuit, and it is to be understood that the valley detecting circuit is substantially identical with the exception of the reversal in polarity of a diode, as will be hereinafter explained. Particularly, the system includes a relay 242 which is adapted to be energized from a positive source of DC potential and input terminal 244. The source of potential is connected through a switch (not shown) to energize the relay through a resistor 246 to ground at 248. During the initial portion of the measuring cycle, that is, when a maximum and minimum signal are to be detected and prior to the generation of the mean signal, the direct current potential at 244 is fed to the relay 242.

The energization of the relay 242 closes a pair of contacts 250 which are connected in a feedback circuit for an amplifier 252. The input signal is fed to an input terminal 254 and through a normally closed pair of contacts 256 to the input of the amplifier 252. The amplifier 252 amplifies the signal fed to an input terminal 258 and the amplified signal is fed through a conductor 260, a diode 262, a normally closed pair of contacts 264 to charge a memory or storage capacitor 270 through a current limiting resistor 272. In the peak circuit shown in FIG. 5, the diode 262 is as shown. However, the diode 262 is reversed in polarity in the valley detecting circuit. Thus the voltage across capacitor 270 varies in magnitude in accordance with the input signal being fed to input terminal 254. It is to be noted that, with the contacts 250 closed, the amplifier 252 acts as a unity gain amplifier. The initial signal being fed to the input terminal 254, and thus the capacitor 270, is a fixed potential and is identical for the circuit 240 whether it be used in connection with the maximum peak detection circuit or the minimum peak detection circuit.

In the peak circuit of FIG. 5, the relay 242 is subsequently deenergized and thus opens the contacts 250. The work being sensed by the low voltage differential transformer is again advanced and a signal is fed to the input terminal 254 which varies in accordance with the runout of the ring gear-pinion assembly. This signal is fed through the normally closed contact 256, the amplifier 252, the diode 262 and the normally closed contacts 264 to vary the charge on capacitor 270 in accordance with the signal being fed to the input terminal 254. If the signal being fed to the terminal 254 is the maximum peak signal, the charge on capacitor 270 will be increased due to the fact that the initial charge on capacitor 270 is a midposition charge. Contrariwise, due to the reversal in polarity of diode 262, if the signal being fed to input terminal 254 is the minimum peak signal, the charge on capacitor 270 will be lessened as the input signal will be less than the initial charge placed on capacitor 270. A capacitor 280 is provided and is of sufficient magnitude to smooth out the variations of the output signals being fed from amplifier 252.

When the work has been scanned for one complete cycle, a second input source of potential at input terminal 282 is activated to provide energy to a second relay 284 directly and to the first relay 242 indirectly through a diode 286. A pair of diodes 288 and 290 have been provided to eliminate relay chatter. With both relays 242 and 284 energized, the normally closed contacts 256 are opened, the normally opened contacts 250 are closed, the normally closed contacts 264 are opened and a pair of normally opened contacts 292 and 294 are closed.

Thus, the amplifier 252 and capacitor 270 are effectively isolated from the input terminal 254 and the signal on the capacitor 270 is fed through the amplifier circuit by means of the closed contacts 292 to the output circuit including an output terminal 298 through closed contacts 294. It is to be noted that the contacts 264 and opened and contacts 250 are closed to isolate the capacitor 270 from the feedback loop to the amplifier to isolate the capacitor 270 directly from directly feeding a signal to the amplifier 272 through contacts 264. However, the feedback loop through contacts 250 is established to operate the amplifier 252 as a unity gain amplifier. Thus the output signal to output terminal 298 will be directly proportional to the charge on capacitor 270 and is indicative of either the maximum or minimum peak or valley depending on the particular interconnection of the circuit 240.

FIG. 6 illustrates one form of matrix circuit 300 which may be utilized to encode digital signals indicative of a particular decimal character into a number of parallel bit output signals for actuating a bar light device. Specifically, a plurality of input terminals 302 to 320 corresponding to numbers 1 through 10, respectively, and a decimal input terminal 322, are interconnected by means of a diode network circuit 340 with a plurality of output terminals 324 to 336, corresponding to the seven output signals necessary to actuate the bar light device, and a decimal output terminal 338.

In a particular example, the decimal number 4 requires an output at B, C, F, and G output terminals in order to actuate the bar light device with the display of the numeral four. Accordingly, the input terminal 308 is connected to the output terminal 326 through a diode 342, to the output terminal 328 through a diode 344, to the output terminals 334, 336 through diodes 346 and 348, 350. Thus an input signal at input terminal 308 energizes the output terminals 326, 328, 334 and 336.

Referring now to FIG. 7 there is illustrated an output indication circuit 360 which may take the form of a shim selector circuit or a bar light display circuit. The circuit 360 includes a relay switching system 362 actuated by the relay operators described in conjunction with FIGS. 1 and 2 and an output module circuit 364 including a units, tens, hundreds and thousands module for providing a digital output signal corresponding to the particular combination of contacts actuated in the relay selector circuit 362. The contacts in the relay circuit 362 are designated 1a, 1b, 1c, 1d ... 9a, 9b, 9c, 9d and 10a, 10b, 10c corresponding to the relay operator circuits 1 through 10 of FIG. 1.

In the preferred embodiment, the system is adapted to indicate the selection of shims corresponding to a dimension of 0.222 through 0.258 in 0.002 increments. If the left side of relay operator 1 is energized, the contacts designated 1a and 1b will be transferred and if the right side of relay operator 1 is actuated, contacts 1c and 1d will be transferred. As will be seen from a further description of FIG. 7, if relay contacts 1a and 1b are transferred, a shim of 0.222 dimension will be selected and if the relay contacts 1c and 1d are transferred, a shim of 0.224 will be selected.

The output module system 364 includes a units module 370, a tenths module 372, a hundredths module 374 and a thousandths module 376. In the particular system illustrated, the modules 370, 372, 374 and 376 are utilized to provide a visual indication of the shim selected, as for example by a bar light device. However, the modules 370 to 376 may be utilized to actually select the shim or some other system may be interconnected with the module 370 and 376 to select the shim.

The units and tenths module 370, 372 are permanently connected to provide a zero and two output reading due to the fact that the shim range is from 0.222 to 0.258, the zero and two always occurring in the output. However, the hundredths module is provided with a hundredths converter unit 380 to convert the particular decimal input to a parallel bit digital output for actuating the hundredths module 374. Similarly, a thousandths converter 382 is interposed between the input signals from the switching circuit 362 and the thousandths module 376 to provide the conversion described above.

The input signal to the circuit 360 is provided by means of an input conductor 386 and the interconnection between the switching unit 362 and the output unit 364 is provided by a plurality of conductors 388 to 396 corresponding to the inputs for the hundredths converter 380 and 398 to 408 corresponding to the inputs to the thousandths converter 382.

In operation, and assuming a shim of 0.226 dimension has been selected, the relay operators 1 and one side of 2 will be energized thus transferring the corresponding contacts 1a, 1b, 1c, 1d, 2a and 2b in the switching circuit 362. With the above noted contacts transferred, a signal will be fed to the hundredths converter by means of conductor 386, contact 10c, contact 1b, contact 3a and conductor 390 to the digit number 2 in the hundredths converter 380. As is seen from FIG. 6, the energization of input terminal 2 (304) will provide an output signal on output terminals A, B, D, E and G, these latter signals being fed through terminal block 410 to the hundredths converter 374. Also, a signal will be fed to the terminal block 410 by means of conductor 386, contacts 10c and 1b and the conductor 388. The conductor 388 is connected through the terminal block 410 to input conductors 412, 414 to energize the unit and tens module 372.

Also, a signal will be fed to the thousandths converter 382 by means of input conductor 386, contacts 10c, 1b, 3a, 1d, 2b and 2c and conductor 404 connected to the digit number 6 in the thousandths converter 382. With the number 6 input digit energized, an output signal will be provided to the thousandths module 376 by means of output terminal C, D, F and G as seen from the circuit of FIG. 6 through the terminal block 418.

A system for testing the unit is provided wherein the input terminal 286 is energized and also an input conductor 420 and a second input conductor 422 are actuated to provide a digital reading of 0.288 for the test configuration.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A system for deriving the mean amplitude of a signal having a minimum and a maximum variation from a fixed level and signaling the reoccurrence of said mean amplitude comprising sensing means for sensing the variations in amplitude of said signal, first detecting means connected to said sensing means for detecting the maximum variation of the signal, second detecting means connected to said sensing means for detecting the minimum variation of the signal, an averaging circuit connected to said first and second detecting means for deriving the mean of said maximum and minimum variation, and signal means connected to said averaging circuit for providing an indication of said mean amplitude.

2. The system of claim 1 wherein said sensing means includes a differential transformer, said differential transformer having a primary and secondary winding means, said primary winding means being energized with an alternating source of electrical energy, and movable core means coupling said primary and secondary winding means, the position of said core varying the coupling of said primary and secondary winding means to produce the signal variations.

3. The system of claim 1 wherein said averaging circuit includes a resistance network having first and second resistance means, said first resistance means being connected to said maximum detector and said second resistance means, said second resistance means being connected to said minimum detector.

4. The system of claim 3 wherein said mean signal is derived from the junction of said first and second resistance means.

5. The system of claim 1 wherein said signal means is connected to said sensing means and said average circuit means, said signal means being enabled in response to the occurrence of said means signal from said sensing means and said averaging circuit.

6. The system of claim 5 wherein said signal means includes first and second switching means, said first switching means being responsive to produce the indicating signal in response to the approach of the signal from said sensing means toward the mean signal in a direction from said maximum signal level and said second switching means being responsive to produce the indicating signal in response to the approach of the signal from said sensing means toward the mean signal in a direction from said minimum signal level.

7. The system of claim 1 wherein at least one of said detector circuit includes a signal level storage circuit, the circuit including means for initially storing a preselected valve of fixed signal in said storage circuit, the input signal from said sensing circuit varying the signal level in said storage in accordance with one of the maximum or minimum variation.

8. The system of claim 7 wherein said detector circuit includes a capacitor storage element, an input circuit, an output circuit and switching means for selectively connecting said storage element to said input circuit and said output circuit.

9. The system of claim 8 wherein the varying signal is cyclical and said switching means includes a first and second switch connecting said input circuit with said storage element and third and fourth switches connecting said storage element with said output circuit, said first and second switches being enabled to connect said input circuit to said storage element during at least one full cycle of said varying signal and said third and fourth switches being enabled to connect said storage element to said output circuit during a subsequent cycle of said varying signal.

10. The system of claim 9 further including an amplifier circuit connected between said first and second switches when enabled and said amplifier being connected between said third and fourth switches when enabled.

11. The system of claim 10 wherein said amplifier is operated as a unity gain amplifier when said first and second switches are enabled.

12. The system of claim 1 wherein said signal means includes a plurality of digital output circuits, an analogue to digital converting means for converting the amplitude of said mean signal to a plurality of digital output signals.

13. The system of claim 12 wherein said converting means includes a plurality of cascaded relay circuits, said relay circuits being selectively bias to respond to selected values of said mean signal.

14. The system of claim 13 wherein said converting circuit further includes a plurality of switch elements connected in a free arrangement, and digital decoding circuit means for deriving a parallel bit code configuration for selected combinations of said switch elements.

15. The system of claim 9 wherein said capacitor element is initially charged to a preselected value prior to said at least one full cycle and the charge on said capacitor element is subsequently varied by said varying signal.

16. A detector circuit for detecting the maximum and minimum amplitude of a varying signal from a null, said detector circuit including a signal level storage circuit for both said maximum and minimum signals, the circuit including means for initially storing a preselected value of fixed signal in said storage circuit, the input signal from said sensing circuit varying the signal level in said storage circuit in accordance with both the maximum and minimum variation from said null to derive a peak and valley signal, and means for deriving the mean deviation of said peak and valley signal.

17. The system of claim 16 wherein said detector circuit includes a capacitor storage element, an input circuit, an output circuit and switching means for selectively connecting said storage element to said input circuit and said output circuit.

18. The system of claim 17 wherein the varying signal is cyclical and said switching means includes a first and second switch connecting said input circuit with said storage element and third and fourth switches connecting said storage element with said output circuit, said first and second switches being enabled to connect said input circuit to said storage element during at least one full cycle of said varying signal and said third and fourth switches being enabled to connect said storage element to said output circuit during a subsequent cycle of said varying signal.

19. The system of claim 18 further including an amplifier circuit connected between said first and second switches when enabled and said amplifier being connected between said third and fourth switches when enabled.

20. The system of claim 19 wherein said amplifier is operated as a unity gain amplifier when said first and second switches are enabled.

21. Apparatus adapted to receive a plurality of devices in consecutive order having a desired dimension and variations thereabout, to provide an electrical signal corresponding to the average dimensional variation about said desired dimension comprising:

first means adapted to receive said devices to measure a dimension of said devices and to generate electrical signals corresponding to said measured dimension:

second means coupled to receive said electrical signal to provide an error signal having an amplitude and polarity depending upon the dimension of the device measured as compared with said desired dimension, and third means coupled to receive said error signal and provide an output signal that varies in amplitude as a function of the average dimensional variation about said desired dimension.

22. Apparatus as defined in claim 21 wherein said first means includes:

transformer means including a movable core having a reference position and extended portion attached to said core;

fourth means for connecting said transformer means so that said transformer means generates a signal, the amplitude and phase thereof, being a function of the position of said core with respect to said reference position;

fifth means for receiving said device so that said dimension to be measured lies in the direction of the movement of said movable core, and sixth means for moving said movable core so that said extended portion engages said device whereby said transformer means generates a signal corresponding to said dimension and said reference point.

23. Apparatus as defined in claim 22 wherein said means includes an amplitude and phase detector circuit connected to said transformer means to provide a direct current signal having an amplitude and a polarity a function of the amplitude and phase respectively of said signal generated by said transformer means.

24. Apparatus as defined in claim 23 wherein the amplitude of the direct current signal provided by said detector circuit approaches zero when said movable core is in said reference position.

25. Apparatus adapted to receive a plurality of devices in consecutive order produced by a machine comprising:

movable measuring means, including a reference position, adapted to receive said devices and move to engage said devices to generate an electrical signal corresponding to a dimension of said device measured with respect to said reference position;

first means coupled to receive said electrical signal for generating an error signal having an amplitude and polarity that is a function of the measured dimension of the device compared to said reference position;

second means coupled to receive said error signal to provide an average signal that varies in amplitude as a function of the average variation of said error signal, and feedback means receiving said average and coupled to control the machine in a direction related to said average signal.

26. Apparatus as defined in claim 25 including:

means for introducing a dead band in the apparatus so that said machine is not controlled by said feedback means unless said dead hand is exceeded.

27. Apparatus as defined in claim 26 wherein:

said measuring means includes transformer means including a movable core having a reference position and extended portion attached to said core;

third means for connecting said transformer means so that said transformer means generates a null signal when said core is in said reference position and a signal having an amplitude and phase determined by the position of said core with respect to said reference position when said core is displaced away from said reference position;

fourth means for receiving said device so that said dimension to be measured lies in the direction of the movement of said movable core, and fifth means for moving said movable core so that said extended portion engages said device whereby said transformer means generates a signal corresponding to said dimension and said reference point.

28. Apparatus as defined in claim 27 wherein:

said first means includes an amplitude and phase detector circuit connected to said transformer means to provide a direct current signal having an amplitude and a polarity, a function of the amplitude and phase respectively of said signal generated by said transformer means.

29. Apparatus as defined in claim 28 wherein the amplitude of the direct current signal provided by said detector circuit approaches zero when said movable core is in said reference position.

30. Measuring apparatus comprising:

transducer means receiving an element for generating an electrical signal that is a function of a measured dimension of said element;

circuit means for periodically activating said transducer means for making periodic measurements thereby generating periodically spaced electrical signals corresponding to said measurements; said transducer means generating an electrical signal for each measurement that has an amplitude that is a function of the amount of the measured dimension of said element differs from a preset dimension and has one sense when the measured dimension is less than the desired dimension and another sense when the measured dimension is greater than the desired dimension, and circuit means coupled to said transducer means receiving said electrical signals for producing a direct current error signal having amplitude and polarity that both vary as an average function of the sense and the amplitude of said periodic electrical signals.